(12) United States Patent
Moses et al.

(10) Patent No.: US 6,314,517 B1
(45) Date of Patent: Nov. 6, 2001

(54) METHOD AND SYSTEM FOR NOTARIZING DIGITAL SIGNATURE DATA IN A SYSTEM EMPLOYING CRYPTOGRAPHY BASED SECURITY

(75) Inventors: Timothy Moses, Kanata; Adrian O. Mancini, Nepean, both of (CA)

(73) Assignee: Entrust Technologies Limited, Ottawa (CA)

( * ) Notice: Subject to any disclaimer, the term of this patent is extended or adjusted under 35 U.S.C. 154(b) by 0 days.

(21) Appl. No.: 09/054,181

(22) Filed: Apr. 2, 1998

(51) Int. Cl.[7] ............................... H04L 9/00; H04K 1/00

(52) U.S. Cl. ...................... 713/156; 713/158; 713/178; 705/76

(58) Field of Search ................. 380/23, 25, 49, 380/30; 713/200, 201, 155, 156, 157, 158, 159, 176, 178, 179; 705/76, 78, 44

(56) References Cited

U.S. PATENT DOCUMENTS

| 5,005,200 | * | 4/1991 | Fischer ................................... 380/30 |
| 5,136,647 | * | 8/1992 | Haber et al. ........................ 713/178 |
| 5,157,726 | * | 10/1992 | Merkle et al. ........................ 380/23 |
| 5,659,616 | * | 8/1997 | Sudia ................................... 380/23 |
| 5,903,651 | * | 5/1999 | Kocher ................................... 380/25 |
| 5,903,882 | * | 5/1999 | Asay et al. ............................. 705/76 |

* cited by examiner

*Primary Examiner*—Gail Hayes
*Assistant Examiner*—Ho S. Song
(74) *Attorney, Agent, or Firm*—Vedder, Price, Kaufman & Kammholz (57) ABSTRACT

A method and system for notarizing digital data, such as digital signature data, determines a subscriber compromised distribution latency period prior to authenticating the digital data. Upon receiving a notarization request, the system and method stores the digital data for notarization and holds the evidence or digital data for the latency period and as such waits to notarize the digital data in response to the subscriber compromise distribution latency period.

36 Claims, 5 Drawing Sheets

METHOD AND SYSTEM FOR NOTARIZING DIGITAL SIGNATURE DATA IN A SYSTEM EMPLOYING CRYPTOGRAPHY BASED SECURITY

BACKGROUND OF THE INVENTION

The invention relates generally to systems employing cryptography-based security, and more particularly to systems employing cryptography based security utilizing digital signatures and key certificates.

With the increase in electronic commerce, the encryption of proprietary information and the application of electronic signatures to documents and other content is becoming more widespread. In some cryptography based systems, such as those employing public key cryptography techniques, digital signature key pairs (a private key and a public key) are used to authenticate a digital signature of a subscriber to ensure that a message sent by a subscriber actually came from the subscriber sending the message. In addition to digital signature key pairs, encryption key pairs are also generally used to encrypt the data being sent from one subscriber to another subscriber.

Certificates are generated by a manager or trusted certification authority, such as a network server, for the public keys of the private/public key pair to certify that the keys are authentic and valid. The public keys and certificates are used for two main purposes: verifying a digital signature and encrypting information. The receiver of a digitally signed e-mail or document for example, typically uses the public key in the sender's certificate to verify the digital signature of the sender. A subscriber wishing to send encrypted e-mail first encrypts the e-mail with a random symmetric key, then uses the intended receiver's public key to encrypt the symmetric key and then attaches the encrypted symmetric key to the encrypted e-mail so that the receiver can decrypt the e-mail. A subscriber unit sending a message sends the encrypted data with its digital signature along with a certificate.

The certificate has the certification authority's signature embedded as part of the certificate. A receiver validates the digital signature by looking at the received certificate. Each client stores a certification authority public key to verify that the certificate was made by the trusted certification authority.

In typical public key cryptography systems, the certification authorities are capable of revoking public key certificates if for example the user's privileges are withdrawn. The certification authority also revokes certificates if the public key of a subscriber is somehow compromised and the subscriber or security personnel notifies a certification authority that the certificate should be revoked so that subsequent receivers of the public key certificate are not fooled into thinking that the sender is the actual subscriber sending the message. For example, in the case of a stolen private key, the unscrupulous holder of the stolen private key could act as the proper user. However if the certification authority revokes the public key certificate for that subscriber, all subscribers receiving messages from the subscriber using a revoked public key certificate are notified through a certificate revocation list (CRL) listing the revoked certificate. Therefore a receiver of a message from an unscrupulous hacker can determine that the content of the message is untrustworthy. In prior art public key cryptography systems, in addition to CRLs, authority revocation lists (ARL) are also typically generated by certification authorities. The authority revocation lists indicate that a particular certification authority has been revoked so that all certificates issued from that certification authority are no longer valid.

As more and more electronic transactions are being made via electronic based networks, digital signature data and other digital data may need to be authenticated at a later date, for example in legal proceedings many years after an electronic agreement was executed. For example, if a wire transfer had been made electronically from one client to another and a dispute arises fifty years later, a mechanism is needed to ensure that the digital signature on the wire transfer was in fact authentic at the time it was sent and that the transaction was wired by authorized personnel. In addition, as technology becomes more efficient at breaking cryptographic codes, digital documents that are digitally signed at one point in time may be easy to forge ten years later which may allow an unscrupulous person to attempt to modify the terms of a contract or wire transfer.

A proposal to help ensure the integrity of electronic digital signatures and data communicated therewith, is to have a type of device that serves as an electronic notary to periodically digitally sign packages of evidence or data to authenticate the original signature on a periodic basis, such as every ten years. Electronic notarization would typically have a higher level cryptographic key, thereby making it more difficult for improper modification of the documents over time. With such a proposal, verification of the authenticity of the digital signature and/or accompanying data is done by issuing a notary token. The notary token may include the digital signature of the notarizing unit and the date and time electronic notarization occurred.

A problem arises with the proposed notary device if a user deliberately compromises their own private key. For example, if a client authorizes an electronic bank transfer and applies their digital signature to the transfer, and the next day denies having authorized the bank transfer, the transfer may have already been approved through the system since typically there is a delay in issuing a certificate revocation. Certificate revocations and postings in a CRL may take hours or days after a certification authority is notified of a compromise. Moreover, generally a user has a certain time period within which to notify a certification authority of the compromise. This time period is typically dictated by contract terms that the user agrees to when becoming a member of the network. This time period before which a user must notify a certification authority that the private key has been compromised, may also be hours or days. Hence, in conventional systems, there is typically a latency period between the time at which a security key becomes compromised and the time at which the compromise needs to be reported. During the latency, the transaction may be inadvertently approved by a receiving subscriber who is not informed of the revocation to the public key certificate in ample time. The result may be catastrophic, particularly in the case where a large sum of money is involved.

Other proposals include sending all digitally stored evidence or documents to a trusted electronic warehouse where the electronic warehouse operator stores the information and archives it with a time stamp indicating when they received it. Again, however, if an unscrupulous person wishes to modify electronic documents there is a single point of failure at the warehouse.

Consequently a need exists for a system for notarizing digital data that provides secure authentication of information that has been digitally signed by a member of the network community.

DETAILED DESCRIPTION OF THE INVENTION

A method and system for notarizing digital data, such as digital signature data, determines a subscriber compromise distribution latency period prior to authenticating the digital data. Upon receiving a notarization request, the system and method stores the digital data for notarization and holds the evidence or digital data for the latency period and as such waits to notarize the digital data in response to the subscriber compromise distribution latency period.

In one embodiment, a latency period determinator calculates the latency period to include security compromise report requirement data, such as the period of time that the subscriber has to report a security compromise to a certification authority and a CRL publication interval such as the time for the certification authority to publish the CRL. A notary unit or other entity then returns a notary token after this period has lapsed to ensure integrity and authenticity of the digital data desired to be notarized.

The latency period determinator may be located in a separate notary device or in a certification authority or other relying party. Notarization may be applied to only the digital signature or alternatively to any data accompanying the digital signature.

In another embodiment, a notary device may respond to a notarization request immediately without use of a latency period by providing a conditional notary token, whereafter an unconditional notary token is generated after lapse of the subscriber compromise distribution latency period.

Figure 1:
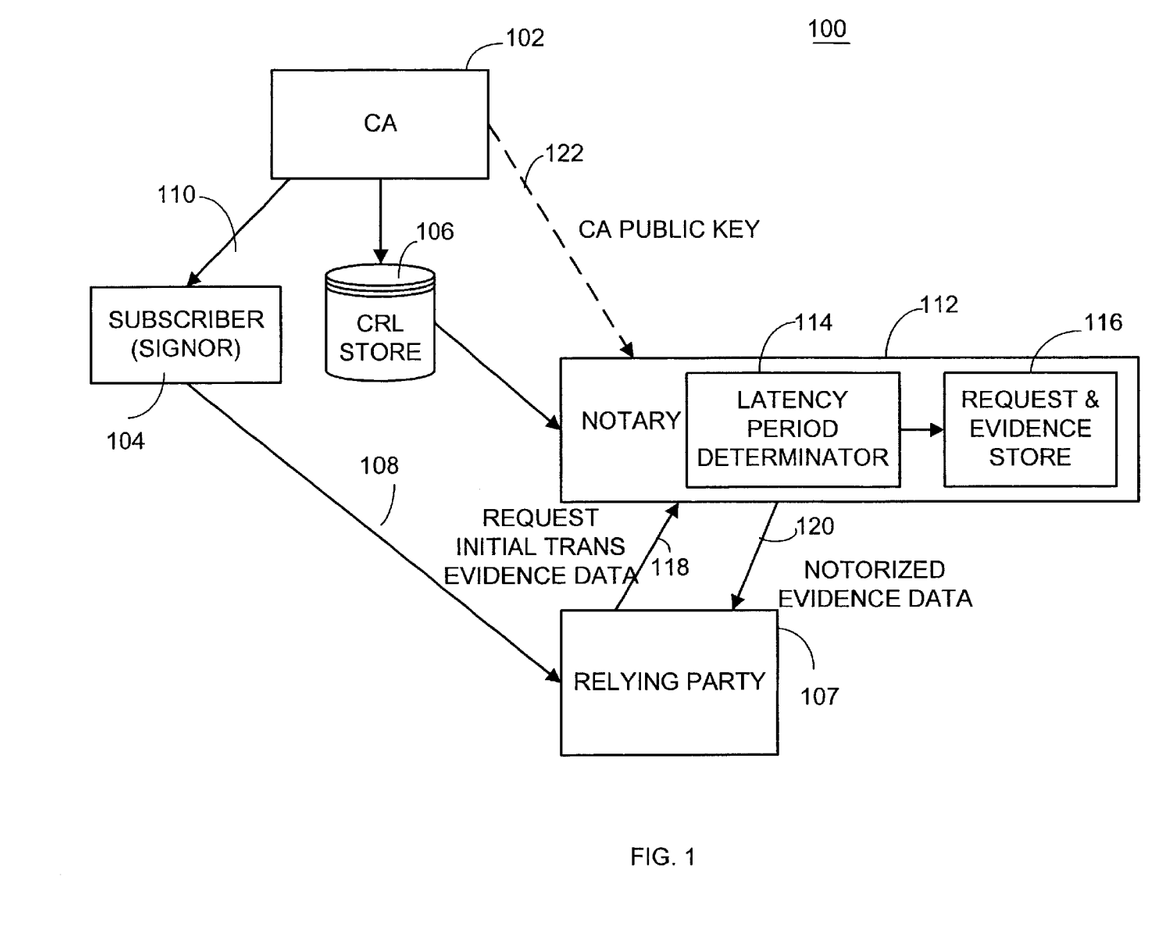
FIG. 1 is a block diagram generally depicting one embodiment of a system for notarizing digital data in accordance with one embodiment of the invention.

FIG. 1 shows a network system 100 employing cryptography based security which has at least one certification authority (CA) 102, which may be a network server that issues certificates, as known in the art. The network system 100 also includes at least one subscriber 104 which may be a software application, network computer node or other entity which may have an associated public/private key pair or other suitable cryptographic keying mechanism to sign and receive digital information within the network. The certification authority 102 stores certificate revocation lists in CRL store 106, as known in the art. The CRL store 106 may be cache memory in the subscriber (relying party unit) 104, in distributed memory, in multiple CAs, in the notary, or other suitable memory location as known in the art. The relying party unit may be one or more software applications, a computer node or other relying unit. The network system 100 also includes another subscriber 107 that for purposes of illustration will be referred to as the relying party which relies on digitally signed data received from subscriber 104 via communication link 108. As with conventional systems, the certification authority 102 signs a public key certificate for the subscriber 104 as indicated by trust line 110. For example, the relying party 107 may be a bank, software application, or computer that receives digital transactions from subscriber 104 (signor). Unlike conventional systems, the network system 100 also includes a notary system 112 that includes a latency period determinator 114 and a notary request and evidence storage unit 116.

The notary system 112 is a trusted third party that verifies correctness of specific data submitted to it. The notary system 112 provides an electronic notary token so that non repudiation evidence may be constructed related to the validity and correctness of an entity's claim to possess data and/or the validity and correctness of various types of data at a particular instant in time. In general, when notarizing possession of data, the notary system 112 verifies the mathematical correctness of the actual digital signature value contained in notarization request data 118 (request signal) from relying party 107. The notarization request data 118 may include for example, initial transaction evidence data such as bits representing a signor's digital signature to be verified, digital data to be verified, the certificate path and CRL's used by the relying party to validate the transaction 108. Other notarization request data may include for example the digital signature of the relying party unit, signor policy identification data, relying party unit policy identification data and bits indicating whether the request is a notary request or other type of request.

The notary system 112 also checks the full certification path or paths from the signing entity (subscriber 104) to a trusted point, such as the notary system's certification authority, or the root certification authority in hierarchical based certificate issuance structures, along with relevant CRLs and ARLs. The notary system 112 generates a trusted time stamp and creates a notary token that is sent with notarized evidence data 120 to the relying party after notarization is complete.

As shown in FIG. 1, the certification authority 102 may certify the public key certificate of the subscriber 104 and also serves as the certification authority for the public key certificate for the notary system 112. Hence the dashed line 122 indicates that the notary system 112 has its notary certificate issued by the CA 102. The notary certificate is included as part of the notary token.

In general, the notary system 112 receives a request signal 118 to notarize initial transaction evidence data that is in the sent request signal. The request and evidence store 116 contains the notarization request data 118. Further information on proposed notary services may be found for example from the PKIX working group of the Internet Public Key Infrastructure Part 6: Notary Protocols Draft. Generally, the notary system 112 verifies the correctness of a digital signature received as part of the initial transaction evidence data using all available and appropriate CRLs, ARLs and public key certificates. The notary system 112 then produces a signed electronic notary token attesting to the validity of the signature. The notary system 112 may verify correctness of the data attached to the digital signature with explicitly stated policies based on policy identification data stored in a notary and also sent with the initial transaction evidence data. For example policy data may be data representing the maximum allowed delay in reporting discovery of key compromise in the CA per terms of the contract between the CA 102 and the subscriber 104.

The notary system 112 also stamps the time of day as part of its notary token to indicate the exact time at which notarization occurred. If desirable, the notary system 112 may send as part of the notary token, identification data that uniquely determines the trust and validation policy used for the notary's signature along with timestamp data representing the time that the notary trusted the evidence data to exist. This identification data may also be the certificate path, or data representing several certificate paths if applicable, and CRL's used to validate the transaction evidence data. The notary system 112 may also include within each signed notary token data indicating whether or not the digital signature or digital data with the signature is verified and if not verified the reason that the verification failed.

The notary 112 may be any suitable computer or digital data processing unit that is suitably programmed to carry out the above-identified cryptographic verification procedures as known in the art. However, in contrast with proposed notary systems, notary system 112 includes the latency period determinator 114 and request and evidence store 116 to facilitate a type of warehousing of the initial transaction evidence data 118 from the request until the subscriber compromise latency period lapses, after which time notarized evidence data 120 (notary token) may be communicated by the notary system 112 to the relying party 107 indicating whether or not the initial transaction evidence data was properly verified. The latency period determinator 114 may be a suitably programmed digital processing device such as a microprocessor or may be implemented in hardware circuitry if desired.

The notarized evidence data 120 (notary token) preferably includes the initial transaction evidence data 118 along with CRL and ARL analysis data, notary digital signature and a notary certificate with an expiry period, and the time stamp of notarization. However, fewer or more of the data elements may be used if desired.

In operation, where a subscriber 104 digitally signs a document such as a bank transfer, the subscriber's digital signature, the transaction information along with subscriber's 104 public key certificate is sent to the relying party 107. The relying party 107, such as a bank, then sends the request 118 to the notary unit 112. Since the request 118 includes the signor's public key certificate, the latency period determinator 114 can determine a latency period for the specific subscriber 104 by reference to the CRL issuance interval, contained in the associated CRL and the subscriber contract terms identified by the certificate's policy identifier. The request with initial transaction evidence data 118 is stored in the request and evidence store 116 by the notary system 112. The subscriber compromise distribution latency period, as determined by the latency period determinator 114, is based in part on security compromise report requirement data, such as the period of time that the subscriber has to report a security compromise to a certification authority. This information may be stored in memory of the notary system 112 for each subscriber in a community of interest, or may be embedded in the public key certificate sent by the subscriber 104 and passed on by the relying party, may be stored in any other suitable location, may be retrieved from the CA 102 or published in an attribute certificate. The notary system 112 also calculates, the time interval for publication of the certificate revocation list once notification is given by the subscriber 104 to its CA that a compromise has occurred. This CRL publication interval is calculated from the contents of the CRL. Hence the CRL publication frequency of the certificate revocation list data that's associated with the verified digital signature data is used by the latency period determinator to determine the subscriber compromised distribution latency period. It will be recognized, however that the CRL publication frequency may be calculated by another unit and passed on to the notary system 112.

Figure 2:
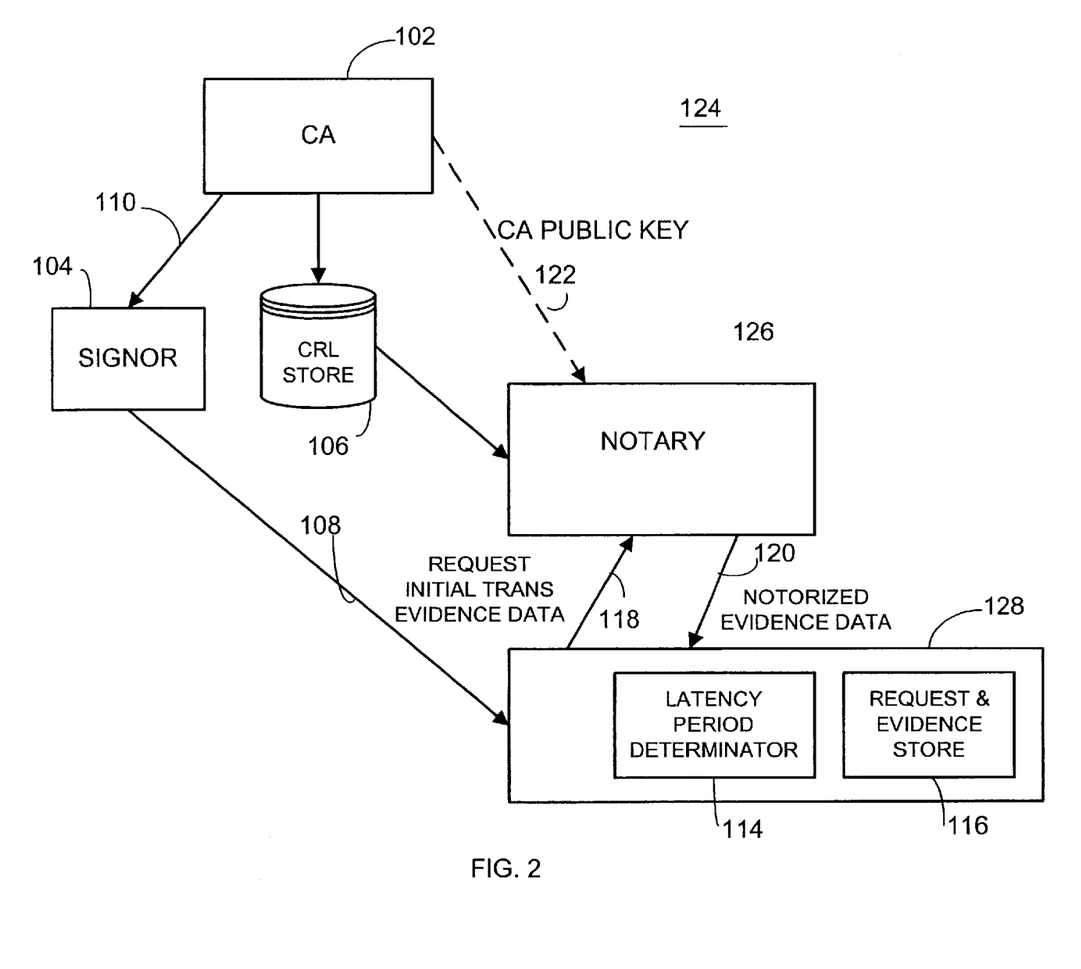
FIG. 2 is a block diagram generally illustrating another embodiment of a system for notarizing digital data in accordance with one embodiment of the invention.

FIG. 2 shows another example of a system 124 employing a latency period determinator 114 and request and evidence store 116 to facilitate a type of warehousing of notarization request data until the subscriber compromise distribution latency period has lapsed. In this embodiment, the transaction is time stamped by the signor, or the relying party immediately after the transaction is received, and the notary system 126 performs the latency period determination and general notarization steps as mentioned above. However, the latency period determinator 114 and request and evidence store 116 are located in the relying party 128. In this embodiment the notarization request data 118 is not sent to the notary system 126 until the subscriber compromise distribution latency period has lapsed as determined by the latency determinator 114. After the subscriber compromised distribution latency period has lapsed and the notarization request data 118 is sent to the notary, the notary obtains the CRL from CRL store 110 (and ARLs if necessary) to verify the initial transaction evidence data 118 as previously described. In response to the verification determination, notarized evidence data 120 is then sent back to the relying party 128.

Since the latency period determinator 114 and request and evidence store 116 are included as part of the subscriber serving as the relying party, the security compromise report requirement data and the publication frequency information is also made available to the relying party 128 by being stored thereon during system set-up or other suitable time by reference to the policy data and the CRL contents.

Preferably, each certificate issued by CA 102 includes certificate policy identification data which indicates the policy to be followed when using a certificate for verification. The certificate policy identification data may identify a particular subscriber report requirement period that defines the maximum elapsed time during which a subscriber is obligated to report a compromise to a certification authority. This is also referred to herein as the CA notification interval. The certification authority 102, as known in the art, issues a public key certificate for the subscriber 104 and also may issue a notary system certificate for the notary system 112. In addition, CA 102 may issue a public key certificate for relying party 107. The certificate policy identification data within each of these certificates may be different depending upon the type of policy which is to be implemented. For example, the subscriber 104 may be required to report a compromise within four hours of the compromise, where as the relying party 107 may have a different and perhaps longer or shorter notification interval to notify CA 102 that a compromise has occurred.

Figure 3:
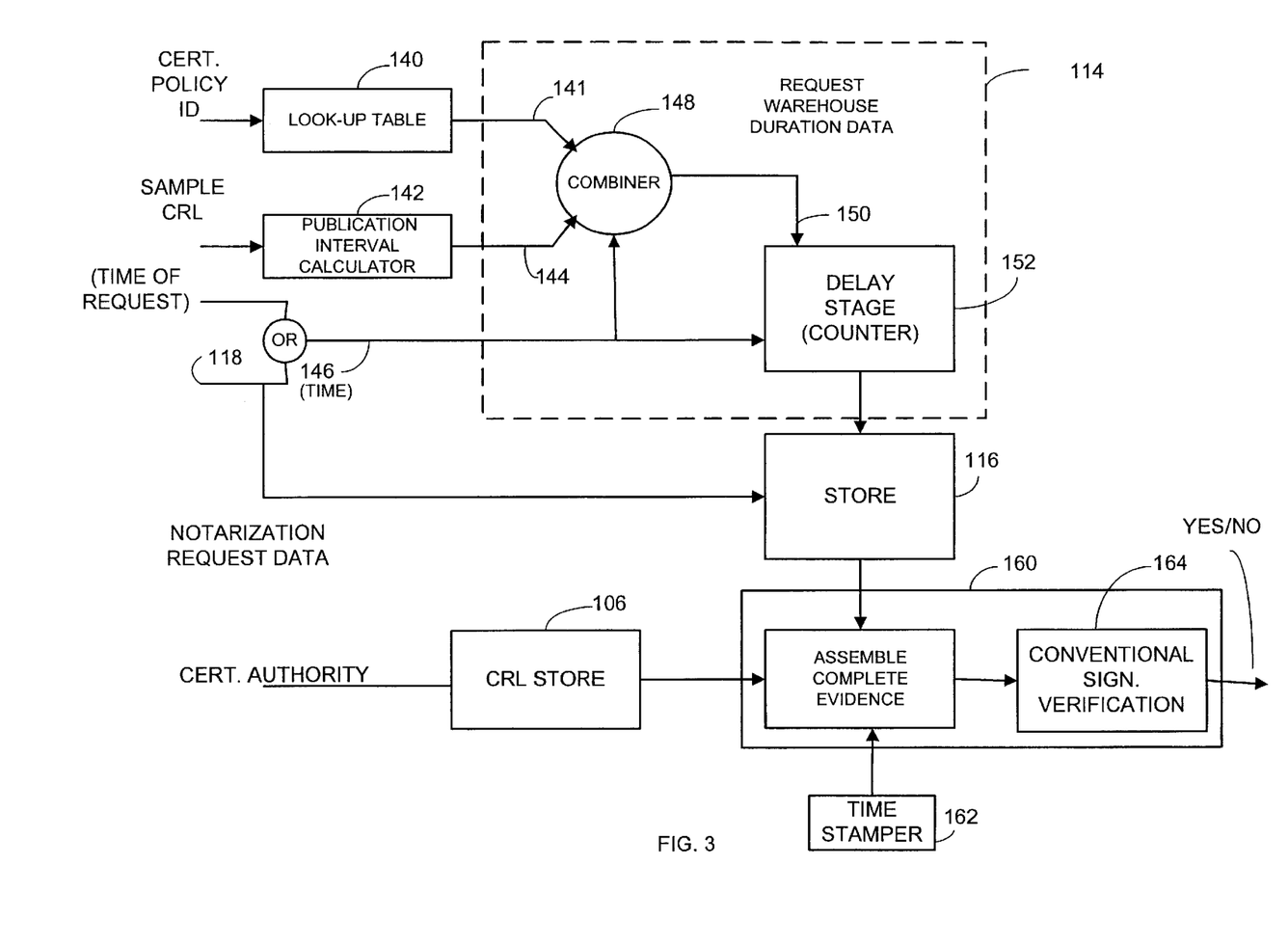
FIG. 3 is a more detailed block diagram of an example of one embodiment of the system for notarizing digital data in accordance with one embodiment of the invention.

As seen in FIG. 3, the certificate policy identification data serves as an index to a look-up table 140 stored in the notary system memory. The look-up table 140 may contain for example, the corresponding differing notification intervals that may be allowable for subscribers within the community of interest obtained from the CA. From the look up table, report requirement data 141 is generated. The notary system 112 also obtains samples from the CRL store 110 and determines, using a publication interval calculator 142, the publication frequency of the certificate revocation list data referred to herein as CRL publication interval data 144. The publication interval calculator 142 may be any suitable counter that determines the time interval between certificate revocation data publication events. The notary system 112 also determines reference time data 146 from an internal clock corresponding to notarization request receipt data, such as the time a notarization request 118 is received and/or from a time stamp applied to the notarization request data either by a signor at the time the data was signed or by a third party, such as the relying party sending the request.

Based on the report requirement data 141, the CRL publication interval data 144 and the reference time data 146, a combiner 148 determines the subscriber compromise distribution latency period. The combiner may be a suitably programmed processing unit. The combiner 148 compares the subscriber compromised distribution latency period to the lapsed time from when it received a notarization request based on the reference time data 146 and generates a request data warehouse duration signal 150 representing a waiting interval (the subscriber compromise distribution latency period), before which notarization should be completed. A delay stage 152, such as a counter, compares the request data warehouse duration signal 150 and the reference time data to determine the amount of delay remaining before lapse of the subscriber compromise latency period. Where the digital request data is time stamped the latency period determinator waits based on the time stamp in reference to the subscriber compromise distribution latency period.

Once the latency period determinator 114 determines that the latency period has lapsed, the notary system 112 retrieves the notarization request data 118 from the request store 116 and assembles the complete evidence in communicator block 160. A time stamp unit 162 stamps the time at which the notarization request was received. The notary system 112 then performs conventional digital signature verification on the signor's digital signature as shown by block 164. The result of the verification is then communicated as the notarized evidence data 120 to the relying party 107. Hence the communicating stage communicates notarization data for the digital data after lapse of the subscriber compromise distribution latency period. As such, the data store 116 facilitates waiting by the notary system 112 to authentic the verified digital signature data based on the subscriber compromised distribution latency period.

Figure 4:
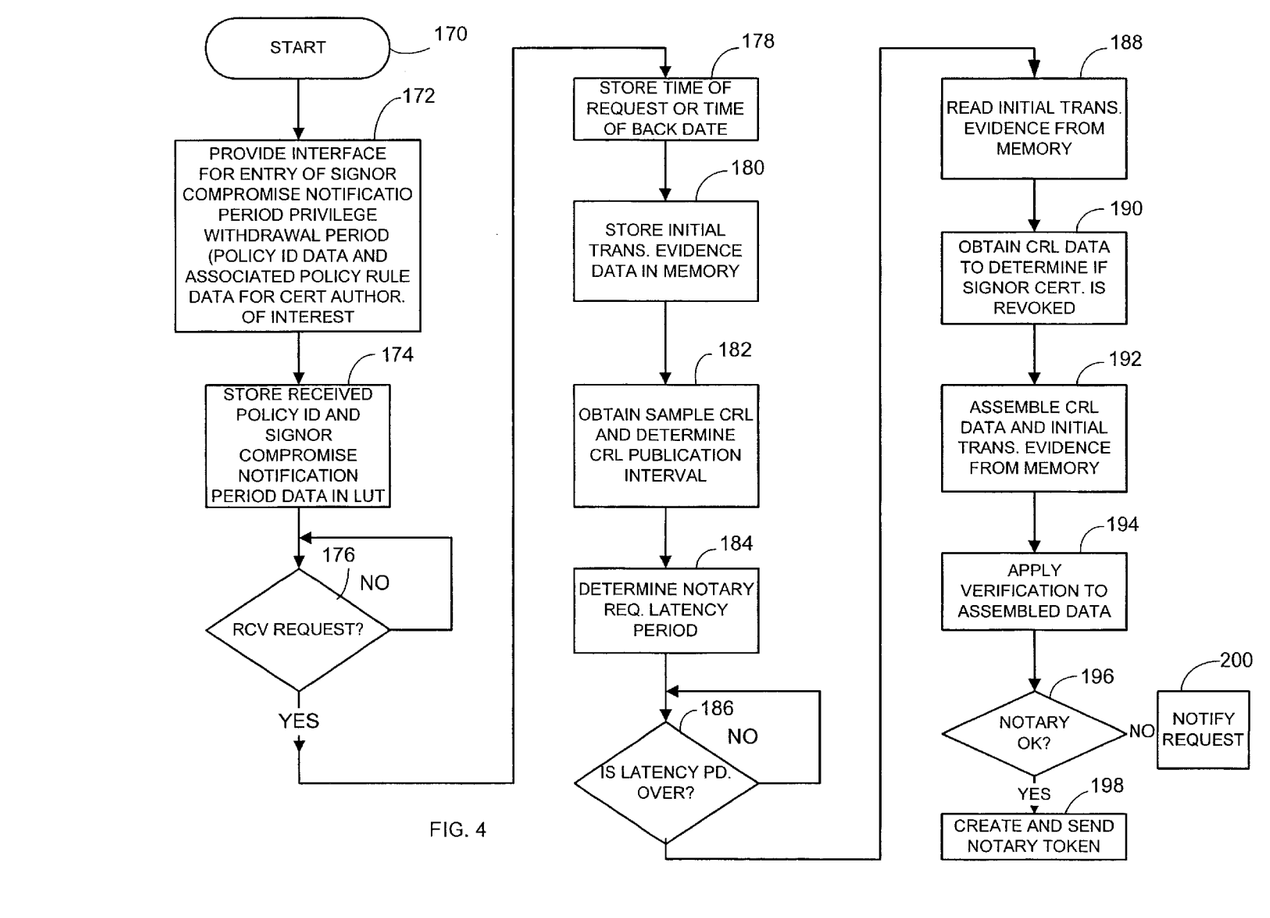
FIG. 4 is a flowchart generally depicting the operation of one embodiment of a notary employing a latency period determinator in accordance with one embodiment of the invention.

FIG. 4 is a flowchart generally showing the operation of notary system 112. As shown in block 170, the notary system 112 becomes initialized and receives a notary certificate from CA 102. As shown in block 172, the notary system may provide a graphic user interface for entry of subscriber compromise notification period, otherwise referred to as the report requirement data and also allows for entry of privilege withdrawal period data. This may be in the form of entry of policy ID) data and associated policy rule data for the certification authority of interest. For example, the certification authority may publish the terms of its subscriber agreement, including the maximum possible delay for reporting a compromise, on a Web-site or similar server, associated with a policy indication. This data can then be imported by the notary. The notary system 112 then stores the received report requirement data and policy identification data in the look-up table 140 as shown in block 174.

The notary system then waits to receive notarization request data as shown in block 176. When notarization request data is received, the notarization system 112 stores the time of the request as shown in block 178 or the time at which it was time stamped. The notary system 112 also stores the initial transaction evidence data that was communicated as part of the notarization request data 118 and stores this in request and evidence store as shown in block 180. In block 182, the notarization system 112 obtains sample certificate revocation lists and determines the CRL publication interval as shown in block 182 to calculate the CRL publication interval 144. By combining the CRL publication interval and the compromise notification period data, the notary system 112 determines the notary request latency period as shown in block 184. Based on the stored time that the request was received, the notary system 112 determines whether the latency period has lapsed as shown in block 186. If the latency period has lapsed, the notary system 112 reads the initial transaction evidence from the request and evidence store as shown in block 188.

Next, the notary system 112 obtains the CRL data to determine if the signor certificate has been revoked as shown in block 190. In block 192, the notarization system assembles the CRL data and the initial transaction evidence data from the request and evidence store and performs standard verification to the assembled data as shown in block 194. If notarization has been properly performed as shown in block 196, the notary system 112 creates the notary token by appending the time at which the request was received or time of the timestamp and sends it in the form of the notarized data as shown in block 198. If the notary is not satisfied, the notary system 112 notifies the requesting unit or relying party as shown in block 200 that verification was not acceptable.

Figure 5:
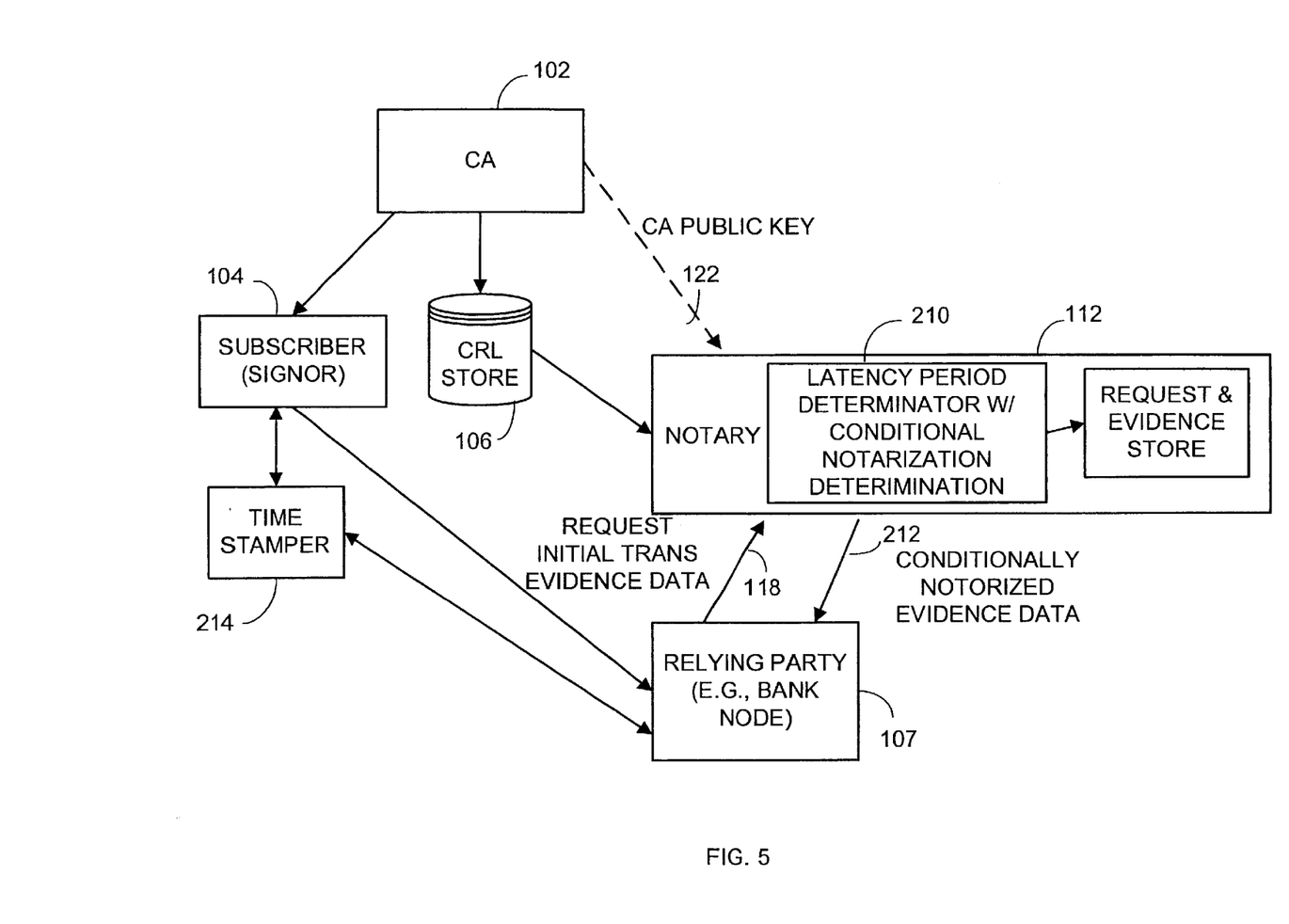
FIG. 5 is a block diagram of another embodiment of a system for notarizing digital data in accordance with the invention.

FIG. 5 depicts another embodiment of a latency period determinator 210 that includes conditional notarization determination. The latency period determinator 210 includes a generating unit that generates conditional notarized data and unconditional notarized data based on the subscriber compromise distribution latency period. The generating unit generates call back data as part of conditional notarized evidence data 212 for a relying party unit. The call back data represents notification that the subscriber compromise distribution period has not yet lapsed. In this way, the requesting unit can call back the notary system at a later time when an unconditional notarization can be made. Also, the notary system 112 can supply a verification of the request data 118 but does this conditionally and notifies via the conditional notarized evidence data 212 that the relying party may be at risk if it relies on the data. As part of the latency period determinator 210, the latency period determinator also communicates the latency period that is remaining in the form of latency period remaining data to the relying party unit so that the relying party unit knows how long to wait until unconditional notarized data will be sent. In this way, if the particular transaction that the relying party is trying to have notarized is of a low risk, the relying party may decide to rely on the conditionally notarized evidence data based on past history and allow a transaction to continue.

Also, the time stamp unit 214 is a trusted time stamp unit that may time stamp the time at which the signor signs the message data or the time at which a request for notarization is sent to the notary depending on the pary requesting the time stamp. In addition, the trusted time stamp unit 214 may generates time stamp data representing the time of notarization if requested by the notary. It will be recognized that any suitable number of trusted time stamp units may also be used.

In all embodiments above, it is preferable but not required, that the notarized data sent back to the relying party unit include at least the time of notarization and notary certificate data. In this way additional notarization may occur many years later and a record will exist as to the exact time of notarization and the exact status of the notary at the time of notarization.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for notarizing digital data in a system employing cryptographic based security comprising the steps of:
   accepting the digital data for notarization by a notarization unit;
   determining a subscriber compromise distribution latency period that includes latency from the time in which security becomes compromised to the time in which the compromise needs to be reported; and
   waiting to notarize the digital data based on the subscriber compromise distribution latency period.

2. The method of claim 1 wherein the subscriber compromise distribution latency period is based on security compromise report requirement data.

3. The method of claim 1 wherein the subscriber compromise distribution latency period is based on a publication frequency of certificate revocation list data associated with the digital data.

4. The method of claim 1 including time stamping the digital data and wherein the step of waiting to notarize includes waiting based on the time stamp in reference to the subscriber compromise distribution latency period.

5. The method of claim 1 including the step of generating call back data for a relying party unit wherein the call back data represents at least notification data as to the expiration of the subscriber compromise distribution latency period.

6. The method of claim 1 including the step of storing notarization request data and communicating notarization data for the digital data to a relying party unit after lapse of the subscriber compromise distribution latency period.

7. The method of claim 1 including generating latency period remaining data and communicating the latency period remaining data to a relying party unit.

8. The method of claim 1 including the step of communicating notarized data to a relying party unit in response to the lapse of the subscriber compromise distribution latency period wherein the notarized data includes at least time of notarization request receipt data and notary certificate data.

9. The method of claim 1 wherein the step of waiting to notarize includes storing notarization request data in response to the subscriber compromise distribution latency period.

10. The method of claim 1 wherein the digital data is digital signature data.

11. A method for notarizing digital signature data in a system employing cryptography based security comprising the steps of:
    accepting digital signature data for notarization;
    determining a subscriber compromise distribution latency period based at least in part on security compromise report requirement data and based at least in part on a publication frequency of certificate revocation list data associated with the digital signature data; and
    waiting to authenticate the digital signature data in response to the subscriber compromise distribution latency period.

12. The method of claim 11 wherein waiting to authenticate the digital signature includes storing the digital signature data until a lapse of the subscriber compromise distribution latency period.

13. The method of claim 12 wherein the subscriber compromise distribution latency period is based on a publication frequency of certificate revocation list data associated with the digital data.

14. The method of claim 11 including the step of generating conditional notarized data and unconditional notarized data based on the subscriber compromise distribution latency period.

15. The method of claim 14 wherein the step of generating conditional notarized evidence data includes generating call back data for a relying party unit wherein the call back data represents notification data as to time remaining before the expiration of the subscriber compromise distribution latency period.

16. The method of claim 11 including the step of storing notarization request data and communicating notarization data for the digital signature data to a relying party unit after lapse of the subscriber compromise distribution latency period.

17. The method of claim 11 including generating latency period remaining data and communicating the latency period remaining data to a relying party unit.

18. The method of claim 11 including the step of communicating notarized data to a relying party unit in response to the lapse of the subscriber compromise distribution latency period wherein the notarized data includes at least time of receipt of data to be notorized and notary certificate data.

19. The method of claim 11 including storing notarization request data in response to the subscriber compromise distribution latency period.

20. A system for notarizing digital data in a system employing cryptography based security comprising:
    a latency period determinator that determines a subscriber compromise distribution latency period that includes latency from the time in which security becomes compromised to the time in which the compromise needs to be reported; and
    a notary request store, operatively coupled to the latency period determinator, that stores digital data for notarization to facilitate waiting to electronically notarize the digital data in response to the subscriber compromise distribution latency period.

21. The system of claim 20 wherein the subscriber compromise distribution latency period is based on security compromise report requirement data.

22. The system of claim 20 wherein the subscriber compromise distribution latency period is based on a publication frequency of certificate revocation list data associated with the digital data.

23. The system of claim 20 wherein the digital data is time stamped prior to notarization and including a controller that waits to notarize based on the time stamp in reference to the subscriber compromise distribution latency period.

24. The system of claim 20 including a generating unit that generates call back data for a relying party unit wherein the call back data represents notification data as to the expiration of the subscriber compromise distribution latency period.

25. The system of claim 20 including:
    a storage medium that contains notarization request data and
    a communicating stage, operably coupled to the storage medium, that communicates notarization data for the digital data to a relying party unit after lapse of the subscriber compromise distribution latency period.

26. The system of claim 20 including a generator that generates latency period remaining data and a communicator that communicates the latency period remaining data to a relying party unit.

27. The system of claim 20 including a communicator that communicates notarized data to a relying party unit in response to the lapse of the subscriber compromise distribution latency period wherein the notarized data includes at least time of receipt of data to be notarized and notary certificate data.

28. The system of claim 20 wherein the digital data is digital signature data.

29. A system for notarizing digital signature data in a system employing cryptography based security comprising:

a accepting unit to receive a digital signature data for notarization;

a latency period determinator, operatively coupled to the accepting unit, that determines a subscriber compromise distribution latency period based on security compromise report requirement data and based on a publication frequency of certificate revocation list data associated with the digital signature data; and a data store, responsive to the latency period determinator, to facilitate waiting to authenticate the digital signature data in response to the subscriber compromise distribution latency period.

30. The system of claim 29 wherein the subscriber compromise distribution latency period is based on security compromise report requirement data.

31. The system of claim 30 including a time stamping unit that time stamps the digital data as part of notarization.

32. The system of claim 31 including a generating unit that generates conditional notarized data and unconditional notarized data based on the subscriber compromise distribution latency period.

33. The system of claim 32 wherein the generating unit generates call back data for a relying party unit wherein the call back data represents notification data as to time remaining before the expiration of the subscriber compromise distribution latency period.

34. The system of claim 29 including:

a storage medium that contains notarization request data, and a communicating stage that communicates notarization data for the digital signature data to a relying party unit after lapse of the subscriber compromise distribution latency period.

35. The system of claim 29 including a generator that generates latency period remaining data and a communicator that communicates the latency period remaining data to a relying party unit.

36. The system of claim 29 including a communicator that communicates notarized data to a relying party unit in response to the lapse of the subscriber compromise distribution latency period wherein the notarized data includes at least time of notarization data and notary certificate data.

* * * * *